March 5, 1935.   J. E. KALGREN   1,993,607
ROTARY GRILL
Filed June 4, 1931   3 Sheets-Sheet 1

Inventor
John E. Kalgren
By his Attorneys
Merchant & Kilgore

March 5, 1935.                J. E. KALGREN                1,993,607
                               ROTARY GRILL
                           Filed June 4, 1931            3 Sheets-Sheet 2

Inventor
John E. Kalgren
By his Attorney

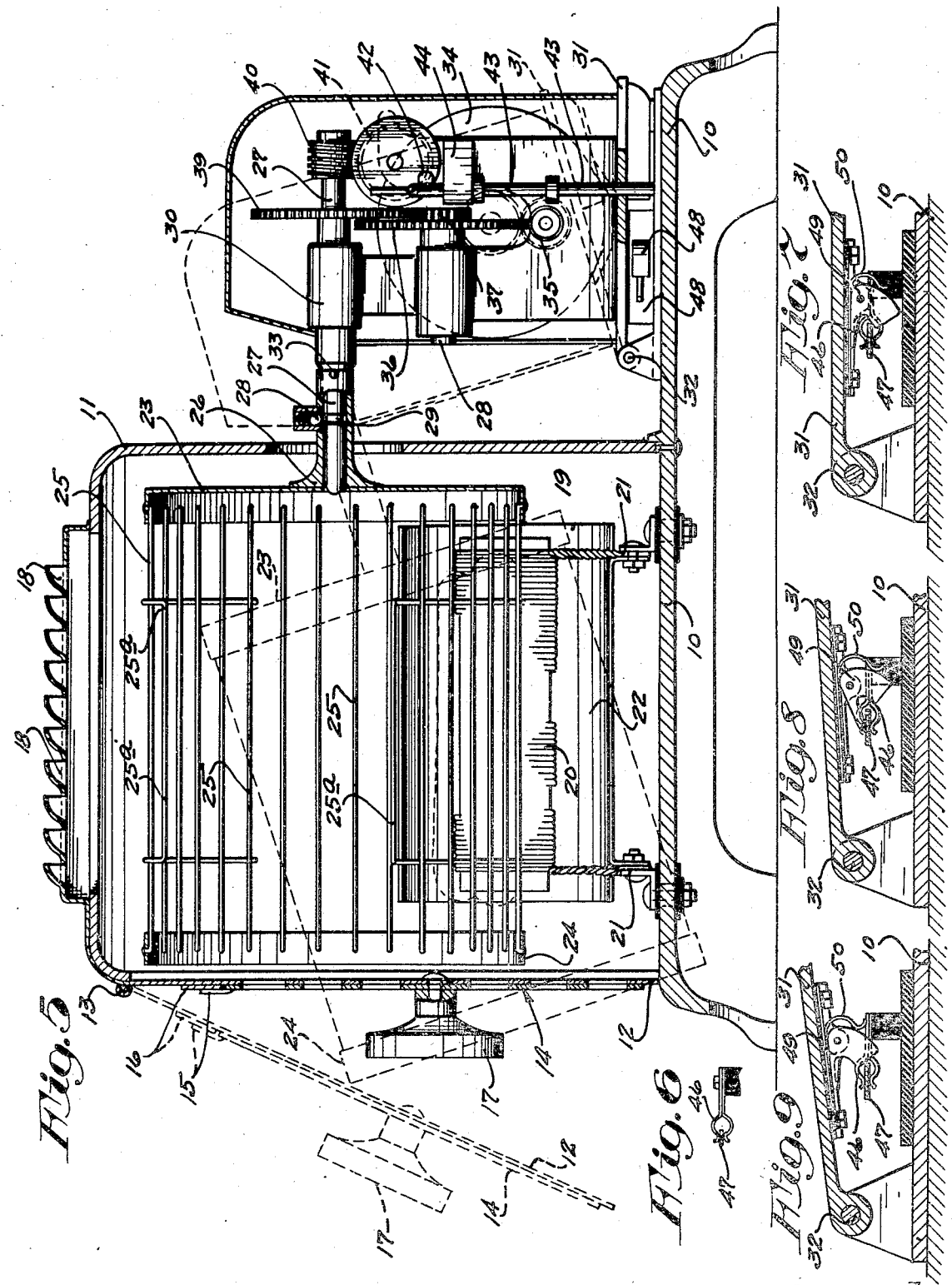

Patented Mar. 5, 1935

1,993,607

UNITED STATES PATENT OFFICE 1,993,607

ROTARY GRILL

John E. Kalgren, Minneapolis, Minn., assignor of one-half to John R. Clark, Minneapolis, Minn.

Application June 4, 1931, Serial No. 542,051

14 Claims. (Cl. 219—35)

My present invention provides an improved rotary grill especially adapted for broiling or roasting wieners but adapted for various other analogous uses, and to the above ends, generally stated, the invention consists of the novel devices, combinations of devices and arrangement of parts hereinafter described and defined in the claims.

The device comprises a rotary grid, preferably in the form of a cage of the squirrel cage type mounted to rotate normally on an approximately horizontal axis and to tilt axially to discharge the wieners at the termination of the broiling action. This rotary grid is arranged within a casing provided with a door adjacent to an open end provided in the rotary grid and within the casing is one or more, preferably two, electrical heating elements arranged to radiate heat directly against the wieners while they are being continuously rotated within and by the cage. For rotating the cage, a small electric motor is provided and this is preferably arranged in circuit with the electrical heating elements. In the electric circuit is a normally open manually closed switch which, when closed, starts the motor into action and connects the heating elements to the source of current supply. The rotation of the rotary grill is determined in respect to the number of rotations and in respect to time, and at the termination of the roasting period, and there is an automatic means for causing the rotary grill to tilt into a discharging position and open the door of the casing when the period of rotation of the cage has been closely approached, and for opening the switch and cutting off the current from the motor and from the heating elements, and for causing the cage to assume its normal horizontal position at the completion of the period of rotation.

Under the above arrangement, the wieners will be automatically discharged from the cage at the proper time and all of the movable parts of the device will automatically assume their normal positions at rest, after each broiling operation. The term "broiling" is herein preferably used to describe the action of the heat on the wieners, because it has been found that when wieners are treated in this grill, the casings thereof will be rendered crisp and when the wieners are eaten, will dissolve and quickly disappear in the act of mastication. The wieners are thereby given a very palatable and desirable flavor, differing very much from that produced by an ordinary baking or frying operation.

A commercial form of this improved rotary grill is illustrated in the accompanying drawings, wherein like characters indicate like parts throughout the several views.

Referring to the drawings:

Fig. 5 is a vertical section from front to rear taken through the complete device on the line 5—5 of Fig. 3;

Fig. 6 is a fragmentary section taken on the line 6—6 of Fig. 4; and

Figure 1:
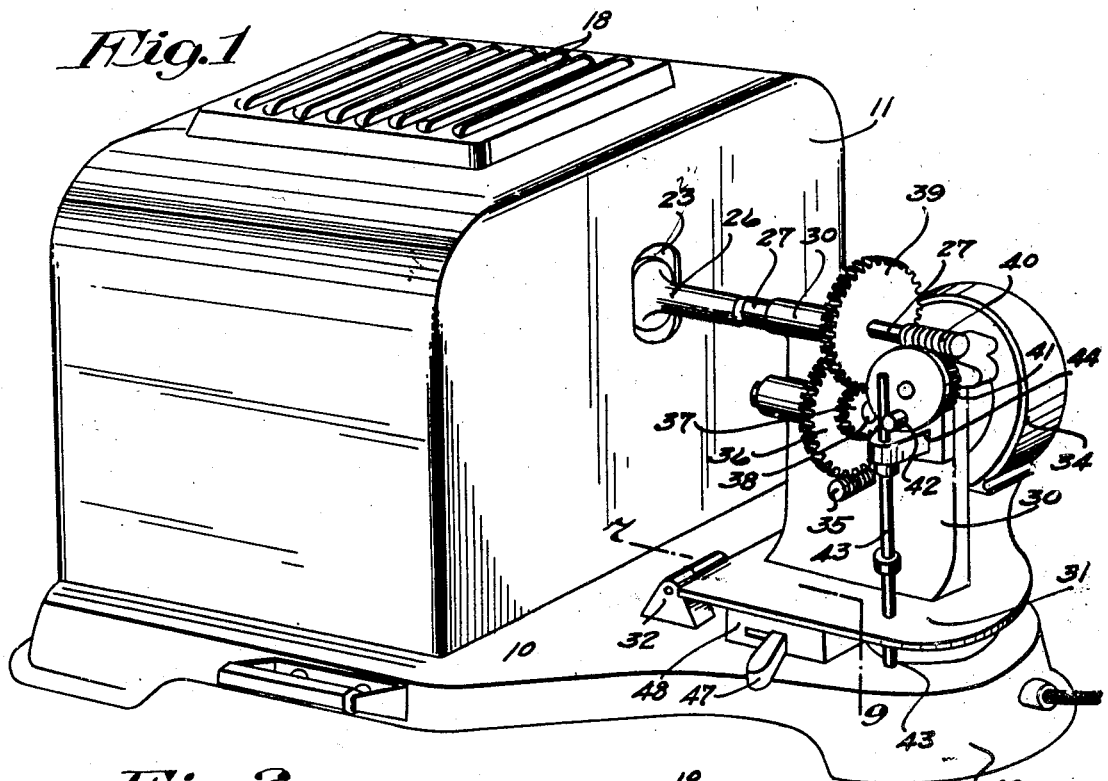
Fig. 1 is a perspective showing the complete grill looking at the same from the rear thereof.
Figure 2:
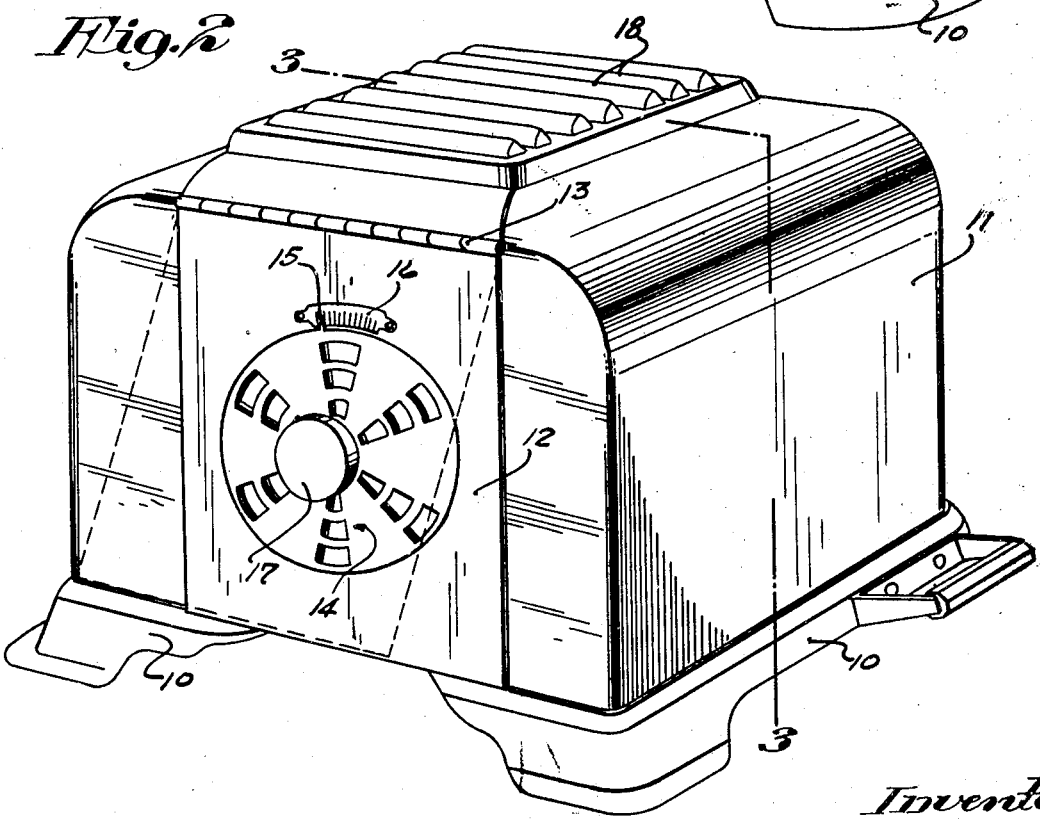
Fig. 2 is a perspective looking at the grill from the front thereof.
Figure 3:
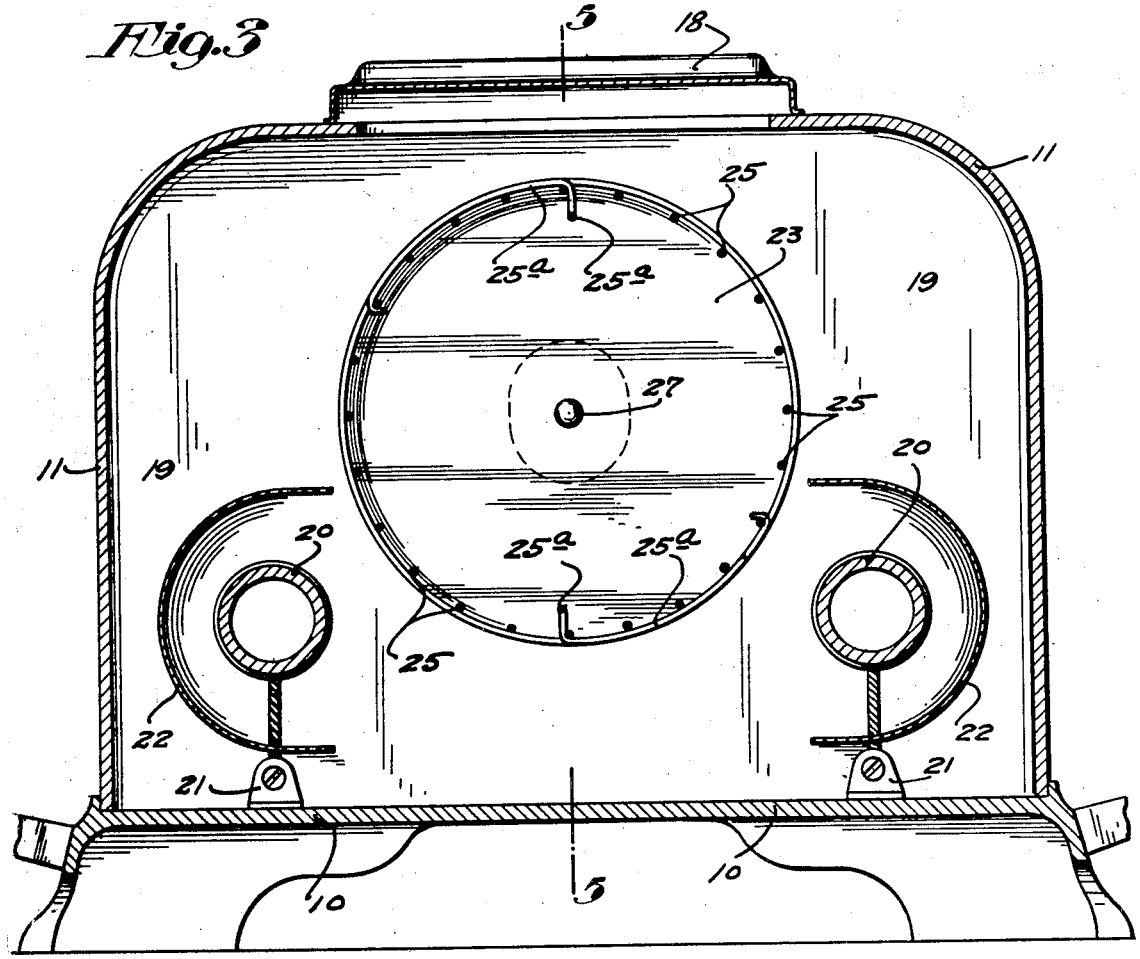
Fig. 3 is a transverse section taken in the plane of the line 3—3 on Fig. 2.
Figure 4:
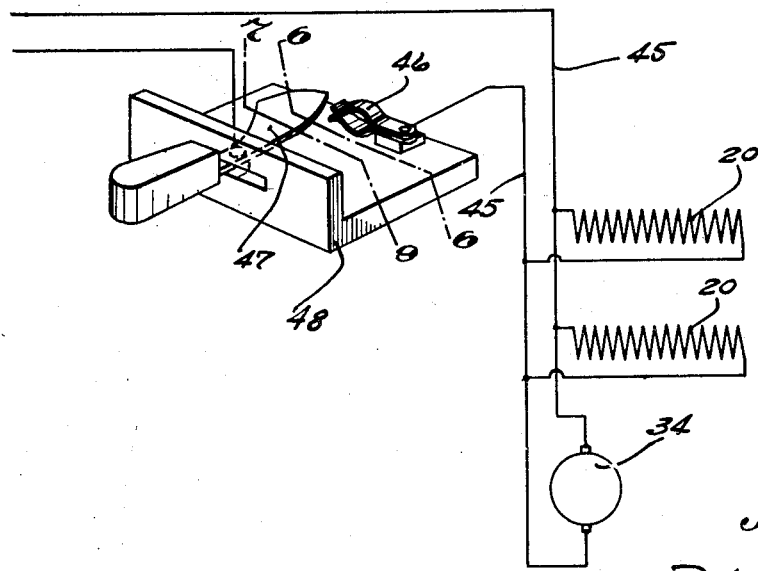
Fig. 4 is a diagrammatic view of the wiring of the device showing the manually-operated control switch in perspective.

Figs. 7, 8 and 9 are sections taken approximately on the line 7—9 of Figs. 1 and 4.

The casing within which the rotary grill is mounted comprises a base 10, and a shell 11. The base 10 projects beyond the rear of the shell 11 and the said shell at its front is provided with a large gravity closed door 12 hinged to the shell at 13 and arranged to be opened by outward swinging movement. In the preferred arrangement and for regulating the draft through the shell, the door 12, as shown, is provided with a rotary damper 14 by adjustments of which the air openings into the casing through the closed door may be varied. Also, as shown, the damper 14 is provided with a pointer 15 that co-operates with a scale 16 on the door to indicate the extent to which its ports are opened. Damper 14, as shown, is provided with a knob 17 by which it may be readily rotatably adjusted. In the top of the shell 11 are louvers 18 that permit a slow escape of the hot air and vapors from the oven formed within the shell.

An oven 19 is formed within the casing 11 and within this oven are electrical heating coils 20, as shown two in number, supported from contact lugs 21 applied to but insulated from the base 10. Heat reflectors 22 placed outward of the coils 21 deflect the heat inward toward the center of the casing.

The rotary grid heretofore referred to as being of the squirrel cage type, is shown as made up of a head 23, an annular rim 24, and connecting rods 25, which latter are so closely spaced that a wiener will not fall between the same. This cage is arranged to rotate in the oven 19 normally on an approximately horizontal axis with its open end afforded by the rim 24 immediately adjacent to the closed door 12. The head 23 is provided with a long sleeve-like hub 26 that is detachably anchored on a tilting spindle 27, by means of a spring-pressed ball 28 on said sleeve, which, as shown, engages a groove 29 in said spindle.

The spindle 27 is mounted to rotate within a supporting column 30 secured on a tilting support 31 in the form of a table that is hinged to lugs 32 rigidly secured on the base 10. For causing the cage to rotate with the spindle 27, the latter is shown as provided with a diametrically projecting pin 33, see Fig. 5, that engages notches in the end of sleeve-like hub 26. To insure lifting and turning of the wieners within the cage when the latter is rotated, the said cage is shown as provided with lifting flights made up of wire members 25ª sprung onto certain of the wires 25 and having inwardly projection portions.

A small electric motor 34 is mounted on the tilting base 31 and its rotor drives a small worm 35 that engages a worm gear 36. Gear 36 and a spur pinion 37 are secured to a short shaft 38 journaled in column 30, and said pinion 38 meshes with a spur gear 39 on the driving spindle 27. Spindle 27 carries a small worm 40 that meshes with a worm gear 41 that is journaled to the columns 30 and one face of which carries a crank pin or projection 42. Crank pin 42 is arranged to engage the upper end of a vertically movable lifting plunger 43 mounted to slide through the tilting base 31 and through a lug 44 on the column 30. Lower end of plunger 43 rests on the base 10.

Fig. 4 diagrammatically indicates the electrical wiring circuit of the apparatus and by reference thereto it will be noted that the motor 34 and the heating coils 20 are connected in parallel to a supply circuit 45 that includes also, in addition to the source of current supply, a normally open master switch which comprises fixed spring contact blades 46, and a switch lever 47, the former of which is rigidly secured to and the latter of which is pivoted to an insulating block 48 conveniently applied on the base 10 just below the tilting base 31. This switch is arranged to be manually closed at will to start the apparatus into operation, but the circuit will be broken automatically at the termination of a predetermined roasting period or broiling action.

This circuit breaker, as shown in Figs. 7, 8 and 9, comprises a cam-acting trip dog 49 pivoted to a lug on the bottom of the tilting base 31 and subject to a light leaf spring 50. The operation of this trip device will more fully appear in the description of the operation, but it may be here stated that under upward tilting movement of the base 31, the lower end of trip dog 49 will be cammed freely backward, through rotation of said grid, while under downward movement of said base, but beveled lower end of said dog will be held in an unyielding position and will cam lever 47 out of engagement with contact blades 46.

Operation

Fig. 5 by full lines shows the various parts in their normal or idle positions. When the cage is to be loaded for roasting or broiling action, door 12 will be swung outward and the wieners will be placed within the cage and the door will then be closed. Switch lever 47 is then manually pressed into contact with blades 46 which starts the motor and the supply of current to the heating coils. When the motor is in action, the cage will, of course, be rotated and the wieners will be tumbled around within the cage, subject all the while to the heat from the electrical heating coils. The cage, of course, is rotated at a very, very low speed in respect to the motor. In the particular machine designed, the motor is arranged to rotate at a speed of approximately twenty-eight hundred revolutions per minute, and the reduction through the gears is such that the cage will be given say eight revolutions per minute. In this particular apparatus also it has been found that with the heating coils employed, the proper roasting or broiling action of the wieners would require about three minutes, or twenty-four revolutions of the cage at the speed stated.

The driving gear illustrated, is arranged to produce the relative speeds above just stated and, moreover, to give the crank-equipped gear 41 one complete rotation every three minutes or for each twenty-four rotations of the cage. The setting of the crank pin or projection 42 on gear 41 is such that when revolved in a counter-clockwise direction in respect to Fig. 5, it will engage the upper end of plunger 43, when the cage has been given say approximately thirty revolutions, and when it thus engages the plunger, it will tilt the base 31 and hence the cage into oblique positions indicated by dotted lines in Fig. 5. When the cage is thus tilted, it will engage the door 12 and force the same into an open position shown by dotted lines in Fig. 5, and the cage will continue to be rotated in its oblique position so that it will discharge the roasted or grilled wieners into a plate or receptacle set to receive the same.

When the cage has completed its twenty-four rotations, crank pin 42 will pass out of engagement with the upper end of plunger 43, thereby permitting base 31 and parts supported therefrom including the cage, to drop back into their normal positions under the action of gravity. This return action, of course, could be assisted by a spring if desired, but in the arrangement illustrated, the weight of the parts mounted on the support 31 is sufficient to accomplish the above return movement under the action of gravity.

As already stated, under upward tilting movement of the base 31, trip dog 49, being free to rotate, will cam itself past the engaged edge of the switch lever 47, but under downward or return movement of said base 31, said dog will cam said lever out of engagement with the contacts 46, thereby opening the circuit 45, cutting off the supply of current to the coils 20 and to the motor 34, so that all of the parts again assume their normal positions and become idle until again started into action by manual closing of switch 47.

Attention is called to the fact that in Figs. 7, 8 and 9, the switch arm 47 is sectioned on the broken line 7—9 of Fig. 4, and by reference to the same view, it will be noted that the end of switch arm 47 is curved. By reference to Fig. 6, it will be noted that it is only the point of the arm 47 that engages between contacts 46 so that a very slight movement of said arm is required to disengage the same from said contacts, and that the tip of said arm is out of line with the sectioned portion thereof, as shown in Figs. 7, 8 and 9.

From the above it is evident that the broiling or roasting action is automatically timed, and the discharge of the broiled or roasted wieners from the cage is accomplished automatically and then automatically the parts resume their normal positions at rest. In actual practice, the efficiency of the device described has been thoroughly demonstrated. It, of course, follows that various alterations and modifications may be made within the scope of the invention herein disclosed and broadly claimed.

What I claim is:

1. In a device of the kind described, the combination with a casing affording an oven, heating means in said oven, a tilting base, a rotary grid open at one end, located within said casing and supported from said tilting base, a motor with connections for rotating said grid at a relatively low speed, and automatic means for tilting said base and rotary grid to eject the broiled articles from the latter after a predetermined action.

2. In a device of the kind described, the combination with a casing affording an oven, heating means in said oven, a tilting base, a rotary grid open at one end, located within said casing and supported from said tilting base, a motor with connections for rotating said grid at a relatively low speed, automatic means for tilting said base and rotary grid to eject the broiled articles from the latter after a predetermined action, said tilting actions being arranged to take place while said grid is still being rotated, and means for restoring said base and grid to normal positions.

3. The structure defined in claim 1 in which said casing has a hinged door arranged to be engaged and opened by said grid when said grid is tilted.

4. The structure defined in claim 1 in which said casing has a hinged door arranged to be engaged and opened by said grid when said grid is tilted, said casing, adjacent the open end of said grid, having a door hinged at its upper edge and arranged to be engaged by said grid and moved into an open position when said grid is tilted into a discharging position.

5. In a device of the kind described, the combination with a casing having a yieldingly closed door at one end, a tilting base adjacent the other end of said casing, a supporting column mounted on said tilting base, a spindle journaled in said column, a rotary grid located in said casing and mounted on said spindle for rotation therewith, said grid being open adjacent the door of said casing, means for radiating heat within said casing, a motor with connections for rotating said spindle, and grid at a relatively very low speed, and motor-actuated means for tilting said base and grid after a predetermined action has taken place, the tilting movement of said grid serving to open the door of said casing and discharge the broiled articles from said grid.

6. In a device of the kind described, the combination with a casing having a yieldingly closed door at one end, a tilting base adjacent the other end of said casing, a supporting column mounted on said tilting base, a spindle journaled in said column, a rotary grid located in said casing and mounted on said spindle for rotation therewith, said grid being open adjacent the door of said casing, means for radiating heat within said casing, a motor with connections for rotating said spindle and grid at a relatively very low speed, and motor-actuated means for tilting said base and grid after a predetermined action has taken place, the tilting movement of said grid serving to open the door of said casing and discharge the broiled articles from said grid, the tilting movement of said grid being arranged to take place during the final part of the rotation thereof.

7. The structure defined in claim 5 in which said rotary grid is detachable from said spindle and is removable endwise from the casing when the door of the latter is opened.

8. The structure defined in claim 5 in which said motor is an electric motor mounted on said tilting base and the heating means in said casing includes a heating coil, and in further combination with an electric supply circuit including said motor and heating coil and a manually closed switch.

9. The structure defined in claim 5 in which said motor is an electric motor mounted on said tilting base and the heating means in said casing includes a heating coil, and in further combination with an electric supply circuit including said motor and heating coil and a manually closed switch, combined further with a switch trip arranged to automatically open said switch when said tilting base is moved from its tilted back to its normal position.

10. In a device of the kind described, the combination with a casing having a yieldingly closed door at one end, of a tilting base outside of said casing adjacent the other end thereof, a supporting column on said tilting base, a spindle rotatably mounted in said column, a rotary grid located in said casing and mounted on said spindle at one end for rotation with said spindle, the other end of said grid being open adjacent to said door, a rotary crank journaled on said column, a motor mounted on said tilting base, speed-reducing driving connections between the rotor of said motor and said spindle and crank arranged to rotate said spindle at a very greatly reduced speed and to rotate said crank at a still further reduced speed, a plunger mounted on said column and base and engaging an underlying relatively fixed support, said crank being arranged to engage and downwardly press said plunger to thereby tilt said base and parts carried thereby including said rotary grid, the tilting movement of said grid serving to open said door.

11. In a device of the kind described, the combination with a casing having a yieldingly closed door at one end, of a tilting base outside of said casing adjacent the other end thereof, a supporting column on said tilting base, a spindle rotatably mounted in said column, a rotary grid located in said casing and mounted on said spindle at one end for rotation with said spindle, the other end of said grid being open adjacent to said door, a rotary crank journaled on said column, a motor mounted on said tilting base, speed-reducing driving connections between the rotor of said motor and said spindle and crank arranged to rotate said spindle at a very greatly reduced speed, and to rotate said crank at a still further reduced speed, a plunger mounted on said column and base and engaging an underlying relatively fixed support, said crank being arranged to engage and downwardly press said plunger to thereby tilt said base and parts carried thereby including said rotary grid, the tilting movement of said grid serving to open said door, an electric heating coil in said casing, and an electric supply circuit including said motor and heating coil, and a manually closed switch also in said supply circuit.

12. In a device of the kind described, the combination with a casing having a yieldingly closed door at one end, of a tilting base outside of said casing adjacent the other end thereof, a supporting column on said tilting base, a spindle rotatably mounted in said column, a rotary grid located in said casing and mounted on said spindle at one end for rotation with said spindle, the other end of said grid being open adjacent to said door, a rotary crank journaled on said column, a motor mounted on said tilting base, speed-reducing driving connections between the rotor of said motor and said spindle and crank arranged to rotate said spindle at a very greatly reduced speed and to rotate said crank at a still further reduced speed, a plunger mounted on said column and base and engaging an underlying relatively fixed support, said crank being arranged to engage and downwardly press said plunger to thereby tilt said base and parts carried thereby including said rotary grid, the tilting movement of said grid serving to open said door, an electric heating coil in said casing, and an electric supply circuit including said motor and heating coil, and a manually closed switch also in said supply circuit, and a switch-tripping dog operative automatically under movement of said tilting base from tilted back to normal position to open said switch.

13. The structure defined in claim 10 in which said crank is arranged to engage said plunger to tilt the base and parts carried thereby at the termination of a predetermined number of rotations of said motor and grid but while said grid is still being rotated.

14. In a device of the kind described, the combination with a casing affording an oven, and heating means within the oven, of a rotary grid of the squirrel cage type open at one end located within said casing and supported therein for rotary and endwise tilting movements, means for rotating said grid, and means for tilting said grid on its axis to cause it to discharge its contents through its open end, said casing being provided with a normally closed door adjacent the open end of said grid, and in combination with means whereby the door will be opened when said grid is tilted to discharge its contents therefrom and from the casing.

JOHN E. KALGREN.